April 1, 1924.

M. SCHIESARI 1,488,942

FRICTION DRIVE TRANSMISSION GEARING

Filed Dec. 30, 1922    4 Sheets-Sheet 1

INVENTOR

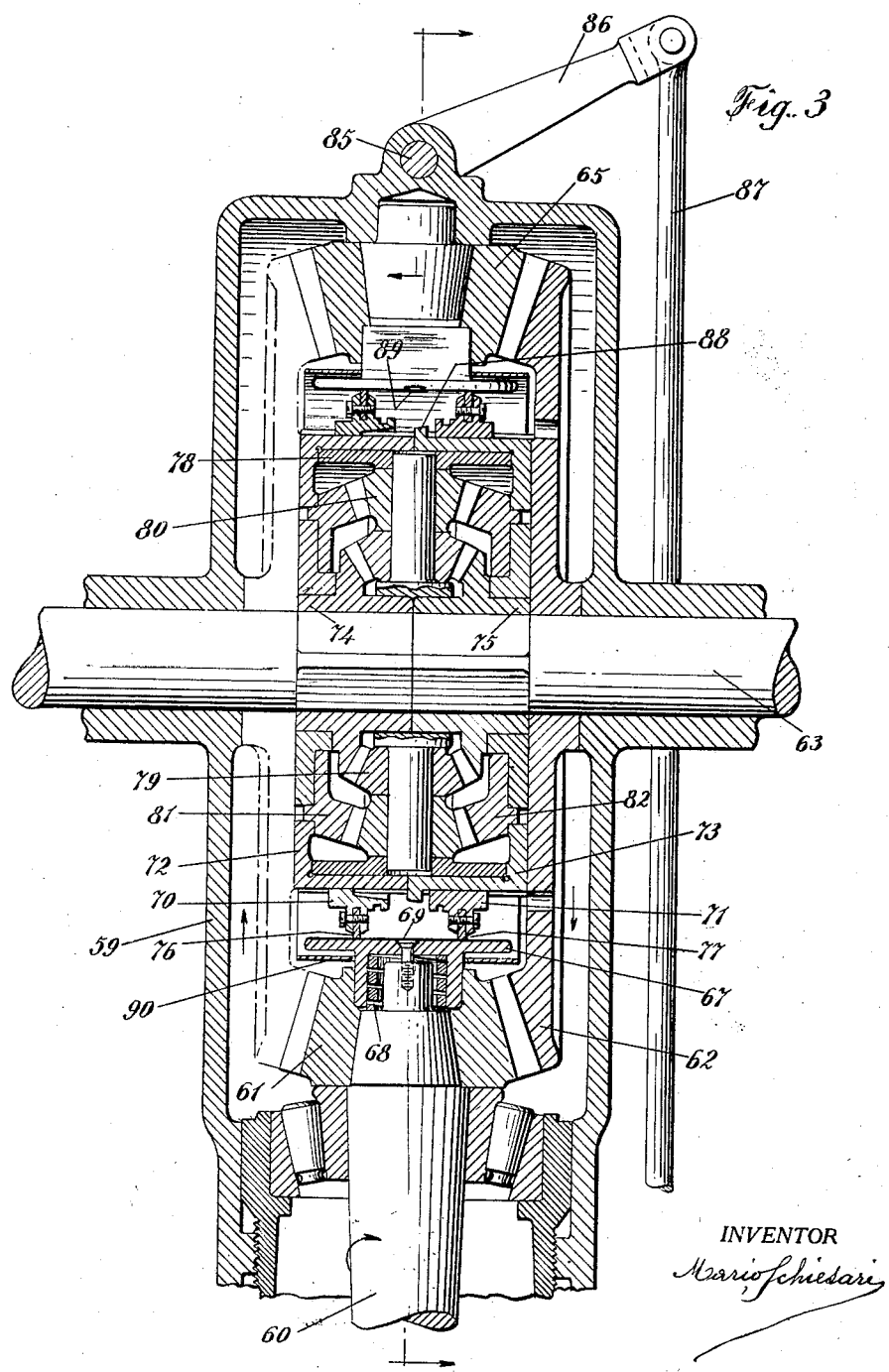

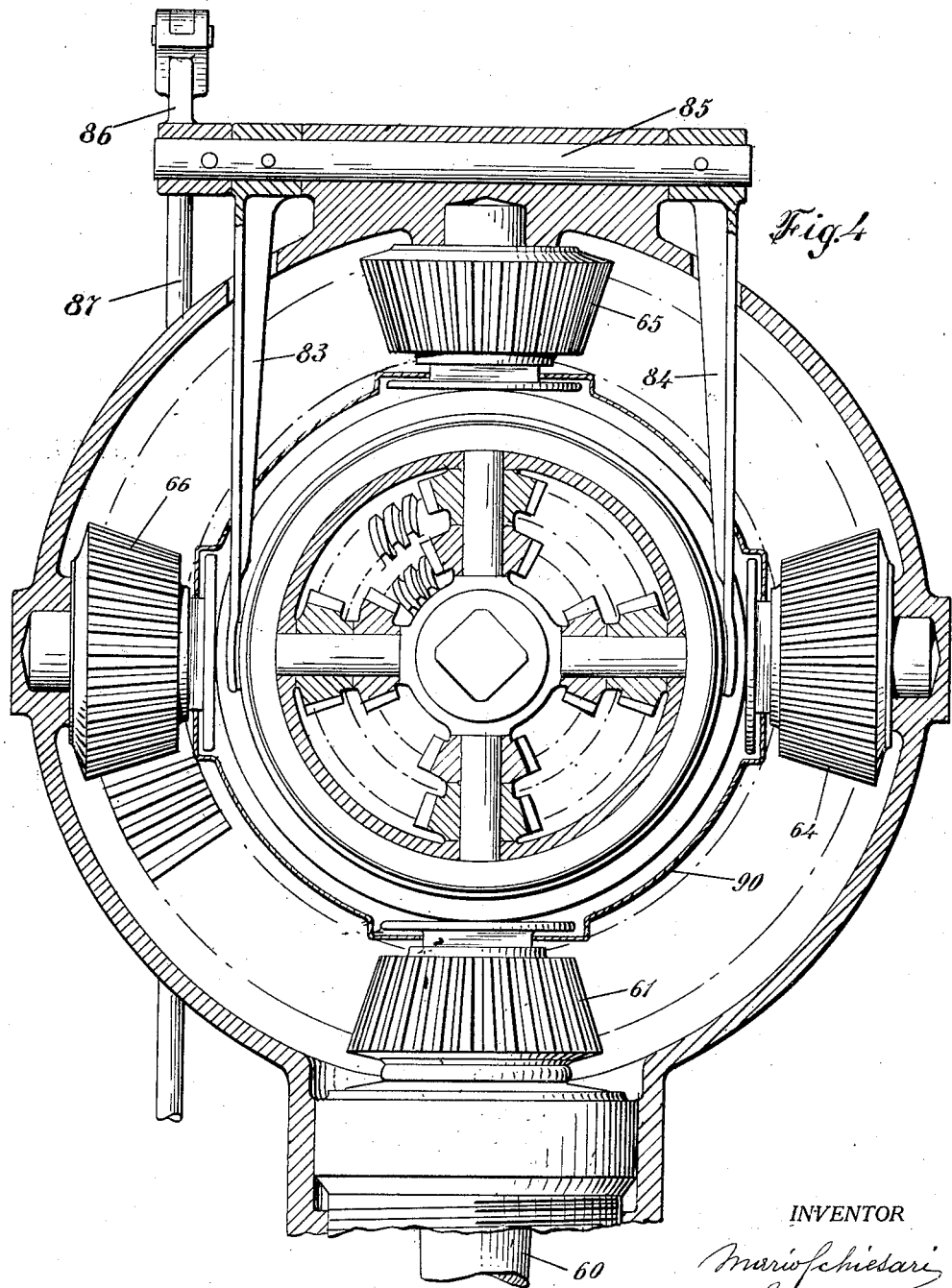

Patented Apr. 1, 1924.

1,488,942

UNITED STATES PATENT OFFICE.

MARIO SCHIESARI, OF NEW YORK, N. Y.

FRICTION-DRIVE TRANSMISSION GEARING.

Application filed December 30, 1922. Serial No. 609,900.

*To all whom it may concern:*

Be it known that I, MARIO SCHIESARI, a citizen of the United States, residing in the borough of Manhattan, in the city, county, and State of New York, have invented certain new and useful Improvements in Friction-Drive Transmission Gearings, of which the following is a full, clear, and exact description, reference being had to the accompanying drawings, forming a part of this specification.

This invention relates to friction drive transmission gearings, and more particularly to a friction gearing specially adapted for use in connection with motor propelled vehicles.

The primary object of my invention is to provide a novel and improved construction of transmission gearing built in one unit with the differential, and avoiding the use of separate units for speed change and differential gearings, which is now universally adopted.

Another object of my invention is to provide a transmission gearing possessed of all the advantages pertaining to a friction drive, but devoid of most of the objectionable features of the friction gearings heretofore in use.

A still further object is to provide a differential gearing of a novel and improved construction, comprising frictional means for effecting changes of speed doing away with the necessity of employing a separate speed change gearing, and retaining at the same time the advantages pertaining to the direct drive which is used at top speed, and which is obtained through positive engagement of the driving and driven members.

With these and other objects in view, as will more fully appear as the description proceeds, my invention furthermore consists in certain novel and improved constructions and arrangements of parts, as will be hereinafter fully described, and claimed in the appended claims.

Aside from some objectionable features which will be presently discussed, the friction type of gearing possesses advantages which are extremely important, the main ones being silent action and infinite gear variations obtainable by means of arrangements far simpler than those required by speed change gearings of the ordinary type. Among other advantages, is the possibility of its being built in a very compact form, which feature makes it possible to combine speed change gearing and differential in a single unit, the dimensions of which need not be much larger, or in fact no larger than those of a differential of ordinary construction.

This form of multiple speed differential gearing, which is especially adapted for use in small cars, furthermore retains the feature of positive gear and pinion direct drive, which in current practice is used by a small car in at least 80% of its mileage.

In the drawings:

Fig. 3 is a cross sectional view in elevation of a balanced action differential gearing also embodying my invention; and Fig. 4 is a side sectional view in elevation of the same.

Figure 1:
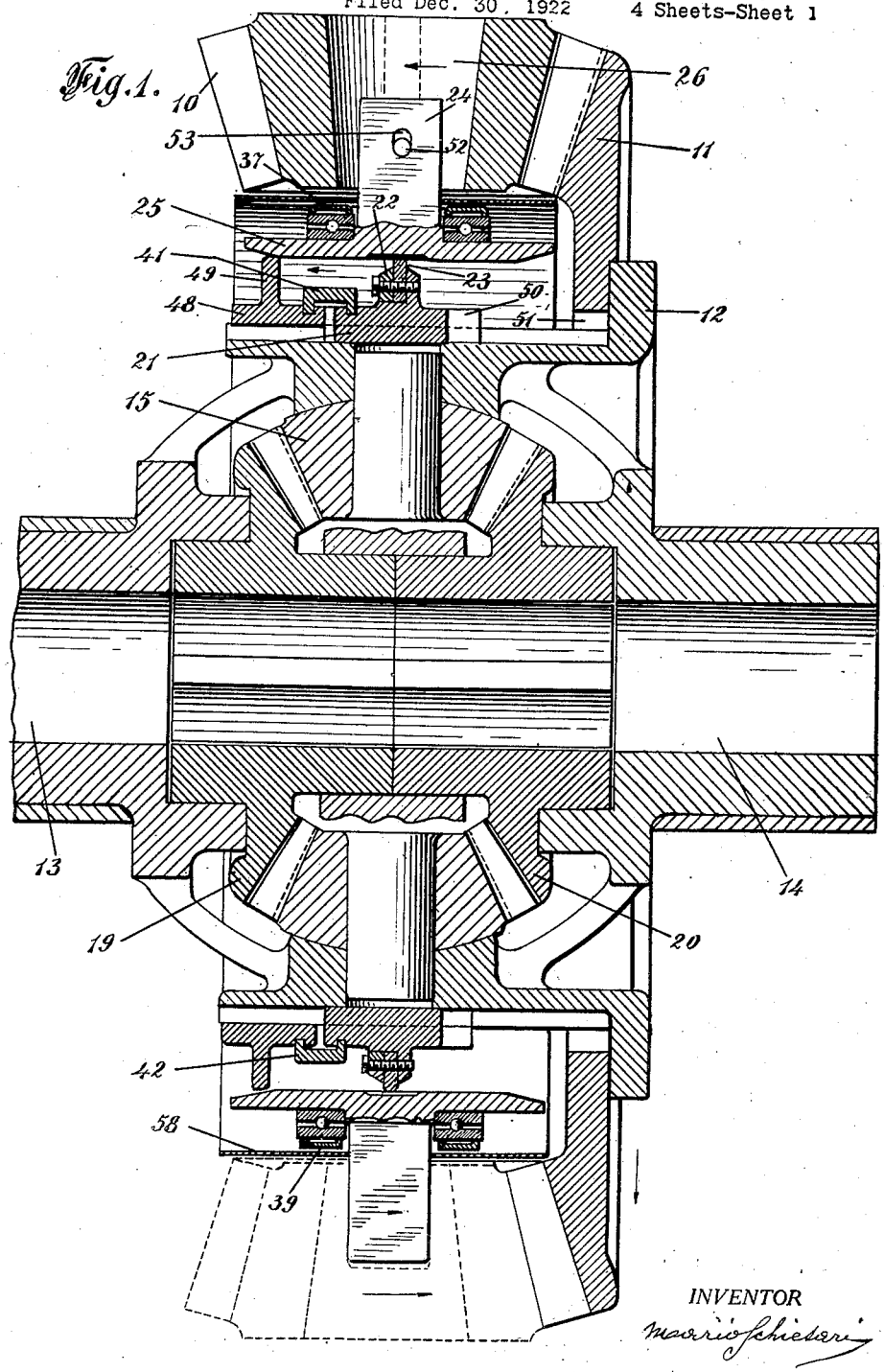
Fig. 1 is a cross sectional view in elevation of a differential gearing embodying my invention.

In the drawings I show the features applied in the preferred forms of gearing, in combination with a differential casing of the usual dimensions, and in the proper proportions; therefore I not only illustrate the novel construction, but also the ease with which the same can be adopted in place of a differential of the ordinary type, without the necessity of changing the design and appearance of the rear bridge.

The same does away with the necessity of a separate speed change gearing, with its casing and control levers, which in my device may be substituted by a single lever moving only forward and backward and not sidewise, easily controlled, therefore, and mastered by the beginner. Additional advantages are a silent performance, ease in starting the car, and lessened weight of the car itself.

A plurality of points of contact along the same circumference may be obtained by means of a plurality of driving discs acting on the same driven wheel; the same plurality of discs, however, may be used to drive two wheels in the opposite direction, extending the leverage, and therefore diminishing the torque, and the necessary pressure for low speeds.

This feature is illustrated in Figs. 3 and 4, which will be later fully described.

Figure 2:
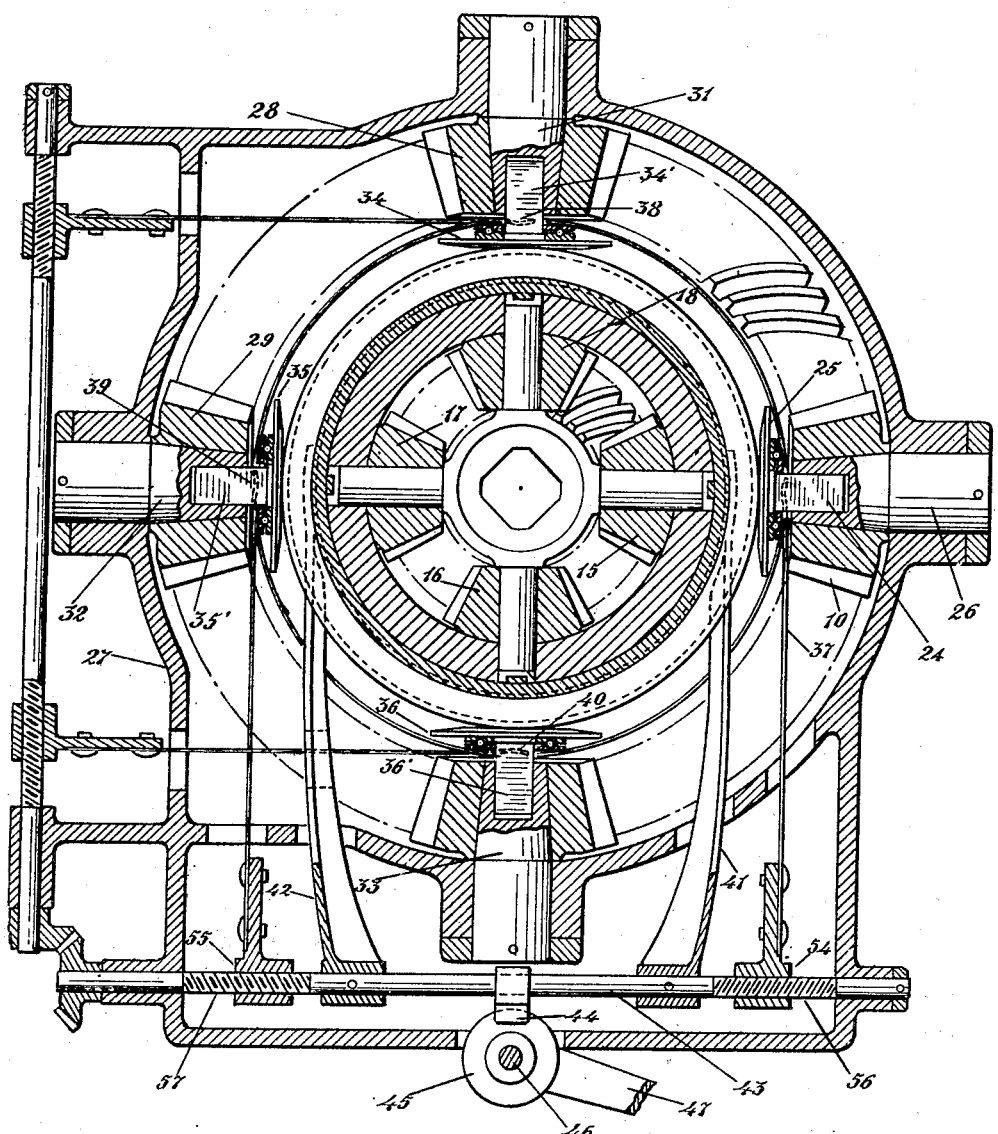
Fig. 2 is a side sectional view in elevation of the same.

In Figs. 1 and 2 is represented a differential mechanism of standard type, adapted and modified to include my novel friction speed change gearing.

In the same, 10 designates the pinion which is mounted on the driving shaft, in mesh with gear 11, which is loosely mounted on the differential casing 12. Said casing, in the usual manner, is loosely mounted on rear wheel shafts 13, 14, and carries four pinions 15, 16, 17, 18, in mesh with bevel gears 19, 20, respectively keyed on shafts 13, 14.

Externally to said casing, and slidably keyed thereon, is mounted a friction wheel consisting of a holder 21 and a washer 22 securing in position a friction rim 23. A friction disc 25, provided with a stem 24, is carried by the shaft 26, on which pinion 10 is mounted, stem 24 being inserted at the end of said shaft so as to rotate therewith, and being able to slightly move in an axial direction in relation thereto. To this end, stem 24 is shown having a square section, but a keyed round stem may of course also be used.

A stationary frame 27, integral with the rear bridge, carries additional pinions similar to pinion 10, in mesh with gear 11, and equally spaced along its circumference; three additional such pinions being shown in the drawings at 28, 29, 30, respectively mounted on shafts 31, 32, 33, rotatably mounted on frame 27. When pinion 10 revolves, gear 11 is driven thereby, and will in its turn cause the rotation of pinions 28, 29, 30, and shafts 31, 32, 33. Each one of said shafts carries a friction disc, similar to 25, and provided with a stem rotatable with the shaft and axially slidable therein, said discs being respectively designated by 34, 35, 36, provided with stems 34', 35', 36'.

Discs 25, 34, 35, 36, are held under pressure against the surface of friction rim 23 by the action of springs 37, 38, 39, 40, respectively, the pressure exerted by which is adjustable, as will be seen.

Holder 21 of friction rim 23 is slidably keyed, as stated, on casing 12, and may be caused to move from the position shown in the drawings, where 23 is opposite the center of the friction discs, toward gear 11, so that the friction wheel may be caused to be driven by the friction discs at speeds varying from zero to the top speed. This movement may be controlled in any suitable manner, for instance by means of shifting levers 41, 42, mounted on a shaft 43, which carries a lug 44 engaged by a grooved cam 45 mounted on a control shaft 46.

An angular motion of shaft 46, which may be effected by means of control lever 47, will therefore result in an angular motion of shaft 43, and axial motion of holder 21.

Shifting levers 41, 42, also engage and cause the axial motion of an idler ring 48, loosely mounted on casing 12 and having a rim 49 equal in diameter to rim 23, and acting to counterbalance the thrust pressure against the bearings of the friction discs.

Holder 21 is provided, on its right face, with clutch teeth 50, adapted to engage corresponding notches 51 in gear 11, when rim 23 has reached the outer diameter of the driving discs; at this point, on account of the bevel shape of the edge of said discs, the friction drive is disconnected, the axial motion of the discs towards the center being limited by pins 52 engaging slots 53 in the stem of said discs, and gear 11 becomes directly connected to holder 21, and through the same to the differential casing 12; the ordinary condition of direct drive is thus duplicated, gear 11 being driven by pinion 10, and the friction drive remaining idle.

The pressure of the springs may be adjusted so as to decrease as the friction leverage of the discs is gradually increased by mounting the same on threaded holders rotatable through the action of the controlling lever; for instance in the manner shown in Fig. 2 in connection with springs 37, 39, which are shown respectively mounted on holders 54, 55, inserted on threaded portions 56, 57 of shaft 43 and controlled thereby. Parts 56, 57, are threaded in opposite directions, and angular motion of shaft 43 causing travel of holder 21 towards gear 11, will cause outward motion of holders 54, 55, diminishing, therefore, the pressure exerted on the discs by springs 37, 39, carried thereby.

By moving holder 21 outwardly, reverse speeds may of course be produced in the same succession, but the springs moving inwardly will now cause the pressure to increase with the increasing of the friction leverage. However, only very low speeds are generally used in the reverse in automobile practice, so that the increase in pressure due to the small leverage used does not noticeably interfere with the operation of the mechanism.

It is thus seen that the efficiency of the friction drive is assured, by adopting a plurality of driving points of contacts equally spaced along the circumference of the driven unit; the unit of necessary pressure per square inch becomes thus automatically and proportionately decreased, and the pressure against the bearings of the driven unit is balanced on all sides. Furthermore, the losses of efficiency due to excessive spring pressure are avoided. It is obvious that the driving points of contact may be increased to six or eight if desired, thus proportionately increasing the useful friction surface.

In the above-described arrangement, idler ring 48 obviously rotates in a direction opposite to that of the friction wheel; filling, however, an important function, which is the counterbalancing of the thrust on the bearings of the driving discs. In the arrangement shown in Figs. 3 and 4 a similar counterbalancing element is made use of by positive driving action, and additional advantages obtained, in lowering the pressure necessary at the low speeds.

The elements composing the friction transmission are preferably protected against the injurious effects of oil and grease employed for gear lubrication, and are therefore protected by a shield 58 separating the discs from the pinions.

In Figs. 3 and 4, 59 designates a casing integral with the rear bridge, 60 the motor shaft, 61 the driving pinion carried thereby, 62 the bevel gear in mesh with said pinion loosely mounted on rear axle 63. Like in the previous case, casing 59 carries three pinions 64, 65, 66, similar to pinion 61, loosely mounted, and in mesh with gear 62.

Each pinion carries a friction disc 67 rotatable therewith, and capable of slight axial motion under pressure of a spring 68, limited by a screw 69. 70, 71, designate two holders respectively slidably keyed on sleeves 72, 73 loosely mounted on the hubs of differential gears 74, 75, said holders carrying friction rims 76, 77, in contact with the surface of the driving discs 67.

78 designates the differential casing proper, internal to sleeves 72, 73, carrying four differential pinions 79 in mesh with differential gears 74, 75, and also carrying four additional pinions 80 coaxial with pinions 79 and in mesh with bevel gears 81, 82 respectively integral and coaxial with sleeves 72, 73.

The axial travel of holders 70, 71 in either direction may be caused by means of shifting levers 83, 84, engaging the same, mounted on a shaft 85, controlled by a lever 86 and rod 87 connected thereto.

In the position shown in the drawings, in which friction rims 76, 77, are equidistant from the center, the same are driven by discs 67 at the same speed, but in reverse directions; pinions 80, therefore, will revolve loosely on their axes, driven by gears 81, 82, rotating at the same speed. If holders 70, 71, are moved slightly to the right, rim 77 will be driven at a speed higher than that of rim 76, on account of the ensuing difference in the relative friction leverage; consequently gear 82, rotating at a higher speed than gear 81, will cause pinions 80 to develop themselves on the face of gear 81 carrying the differential casing 78 and the pinions 79 around the axis of the rear axle. Pinions 79, in the usual manner, will drive the two portions of the rear axle through gears 74, 75, with which said pinions 79 are interlocking.

When the holders 70, 71, are moved totally to the right, the friction drive becomes disengaged, like in the previous case, and holder 71 engages gear 62 for the direct drive.

The opposite happens if holders 70, 71, are moved in the opposite direction, the speed of the rear axle being proportional to the difference in speed between the two friction rims or wheels. On the direct drive, holder 70 is preferably temporarily connected to sleeve 73, through engagement with its wedge-shaped rim 88, to avoid all losses through friction. In said position, rim 76 is coaxial with pinions 61, 64, 65, 66, and does not touch the driving discs, which at the center may be provided with a depression 89.

In the arrangement just described, the zero speed of the driven axle does not take place when the driven rim or wheel is in line with the center of the driving disc, but it takes place when both driven rims or wheels are in contact with said driving disc or discs at a point intermediate between the center and the periphery. The friction leverage for low speeds has therefore been increased, and the pressure required to exert a sufficient frictional resistance accordingly lessened.

The pressure required for the higher speed being the same, as in a friction gearing of ordinary type, the difference between the highest and the lowest pressure required is less than in the ordinary case, and the adjustment of the spring pressure applied in the previous case may with less harm be omitted.

Also in this case a shield 90 has been provided protecting the friction mechanism from oil and grease.

From the foregoing it is seen that I provide a speed change frictional gearing which embodies many novel and advantageous features from the standpoint of efficiency in operation; the construction of which, furthermore, is peculiarly adapted for use in combination with differential gearing, and adapted therefore to be applied in motor cars in substitution of the usual speed change gearing and differential in separate units.

The feature of simultaneously driving the driven element in a friction gearing (represented in the drawings by rim 23 and by rims 76, 77) at various points along its circumference, may be applied in connection with friction transmissions per se, used for purposes other than those mentioned, and not necessarily requiring the use of other elements in combination therewith. The general terms in use for the elements constituting a frictional gearing being "disc" for the driving element, and "wheel" for the driven element, I will use the term wheel in the claims instead of the term rim used throughout the specification to indicate the particular form of driven element used in the embodiment of my invention shown in the drawings. However, this is done for the sake of clarity, and not in a limiting sense, since it is obvious that the functions of the elements mentioned could be reversed, by employing a plurality of wheels for driving another wheel or a disc.

The drawings are intended for illustrative purposes only, and not in a limiting sense, since it is obvious that many details of construction may be changed without departing from the spirit of my invention; also, that many of the features forming a vital part of my invention may be embodied in forms of gearing totally different from those shown.

I therefore reserve myself the right to design and use devices embodying my invention in any manner or form as may be suggested by special requirements in different cases, and such as may enter, fairly, into the scope of the appended claims.

I claim:

1. In a gearing, the combination, with a friction driven element, of a plurality of friction driving elements in contact therewith at points distributed along a circumference on the surface of said driven element, simultaneously driving said driven element.

2. In a friction gearing, the combination, with a driven wheel, of a plurality of driving discs in simultaneous contact therewith at points distributed along the circumference of said wheel.

3. In a gearing, the combination, with a friction driven element, of a gear coaxial therewith, and a plurality of friction driving elements distributed along a circumference on the surface of said driven element, and in contact therewith, simultaneously driven by said gear.

4. In a gearing, the combination, with a friction driven element, of a gear coaxial therewith, a pinion at right angle thereto driving said gear, a friction driving element coaxial with said pinion and rotating therewith, and additional friction driving elements simultaneously operated by said gear.

5. The combination of a pinion, a gear driven thereby at right angle thereto, a driven friction wheel coaxial with said gear, and a plurality of friction driving discs distributed along the circumference of said wheel, and in contact therewith, simultaneously operated by said gear.

6. The combination of a pinion, a gear driven thereby at right angle thereto, a driven friction wheel coaxial with said gear, a friction driving disc coaxial with said pinion and rotated therewith, in contact with said wheel, and additional friction driving discs, distributed along the circumference of said wheel, and also in contact therewith, simultaneously operated by said gear.

7. In a gearing, a rotatable member, a member adapted to be positively driven thereby when interlocking therewith, coaxial with said rotatable member, means for axially moving one of the said members in relation to the other, and means driving said driven member by friction when out of interlocking engagement with said rotatable member.

8. In a speed change transmission gearing, the combination of a differential gearing comprising a casing, a gear loosely mounted on said casing, a driving pinion therefor, a driving disc rotatable with said pinion, a driven rim in contact with said disk and slidably keyed on said casing, means for causing the axial travel of said rim, and means establishing direct connection between said driven rim and said gear at the end of the axial travel of said driven rim corresponding to its maximum forward speed.

9. In a speed change transmission gearing, the combination of a differential gearing comprising a casing, a gear loosely mounted on said casing, a driving pinion therefor, a driving disc rotatable with said pinion, a driven rim slidably keyed on said casing, means for causing the axial travel thereof, automatically adjustable pressure means maintaining said disc in contact with said rim, an additional driven element counterbalancing the pressure exerted against the bearings of said driving disc, and means establishing direct connection between said driven rim and said gear at the end of the axial travel of said driven rim corresponding to its maximum forward speed.

10. In a speed change transmission gearing, the combination of a differential gearing comprising a casing, a gear loosely mounted on said casing, a driving pinion therefor, additional pinions in mesh with said gear rotatably mounted on an outer stationary casing, a driving disc rotatable with each pinion, a driven rim in contact with said disk and slidably keyed on said differential casing, means for causing the axial travel of said rim, and means establishing direct connection between said driven rim and said gear at the end of the axial travel of said driven rim corresponding to its maximum forward speed.

11. In a friction gearing, and in combination with a driven wheel, a driving disc in contact therewith, a pinion rotatable with said driving disc, a gear driven by said pinion, additional driving discs in contact with said driven wheel, driven by said gear, and means for causing the axial travel of said driven wheel.

12. In a speed change transmission gearing, the combination of a differential gearing comprising a casing, a gear loosely mounted on said casing, a driving pinion therefor, an outer stationary casing, additional pinions in mesh with said gear rotatably mounted on said outer casing, a driving disc rotatable with each pinion, a driven rim slidably keyed on said differential casing, means for causing the axial travel of said rim, adjustable pressure means maintaining said discs in contact with said rim, means counterbalancing the pressure exerted against the bearings of said driving discs, and means establishing direct connection between said driven rim and said gear at the end of the axial travel of said driven rim corresponding to its maximum forward speed.

13. In a gearing, a gear, friction driving means operated thereby, and a driven member movable in relation to said gear and friction means, said driven member being adapted to be driven by said friction means at certain positions, and being adapted to be directly driven by said gear at certain other positions.

14. In a gearing, the combination, with a driven element, of positive driving means therefor, a plurality of simultaneously operated friction driving elements adapted to drive said element, and means causing said driven element to be associated with said positive driving means, or to be associated with said friction driving elements.

15. In a gearing, a rotatable member, a member adapted to be positively driven thereby when interlocking therewith, means for altering the relative positions of said two members, causing the latter to become disengaged from the former, and a plurality of simultaneously operated friction driving elements adapted to drive said driven member when thus disengaged.

16. In a gearing, a rotatable member, a member adapted to be positively driven thereby, and a plurality of simultaneously operated friction driving elements adapted to drive said driven member, when the same is not driven by said rotatable member.

MARIO SCHIESARI.